(12) United States Patent
Van De Par et al.

(10) Patent No.: US 8,140,542 B2
(45) Date of Patent: Mar. 20, 2012

(54) METHOD OF ORGANISING CONTENT ITEMS

(75) Inventors: Steven Leonardus Josephus Dimphina Elisabeth Van De Par, Eindhoven (NL); Martin Franciscus McKinney, Eindhoven (NL); Janto Skowronek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/598,214

(22) PCT Filed: Apr. 24, 2008

(86) PCT No.: PCT/IB2008/051585
§ 371 (c)(1),
(2), (4) Date: Oct. 30, 2009

(87) PCT Pub. No.: WO2008/132673
PCT Pub. Date: Nov. 6, 2008

(65) Prior Publication Data
US 2010/0138427 A1    Jun. 3, 2010

(30) Foreign Application Priority Data

May 1, 2007  (EP) ..................................... 07107289

(51) Int. Cl.
*G06F 7/00*   (2006.01)
*G06F 17/30*  (2006.01)

(52) U.S. Cl. ......................... 707/748; 707/603; 707/803
(58) Field of Classification Search .................. 707/748, 707/603, 803
See application file for complete search history.

(56) References Cited

U.S. PATENT DOCUMENTS

| | | | |
|---|---|---|---|
| 5,918,223 A | 6/1999 | Blum et al. | |
| 6,963,975 B1* | 11/2005 | Weare | 713/176 |
| 7,024,424 B1 | 4/2006 | Platt et al. | |
| 7,096,234 B2 | 8/2006 | Plastina et al. | |
| 7,197,493 B2 | 3/2007 | Ashby et al. | |
| 2005/0071329 A1* | 3/2005 | Weare | 707/3 |
| 2006/0112098 A1 | 5/2006 | Renshaw et al. | |
| 2006/0265421 A1 | 11/2006 | Ranasinghe et al. | |

* cited by examiner

*Primary Examiner* — Shahid Alam
*Assistant Examiner* — Joshua Bullock

(57) ABSTRACT

A method of organizing content items includes obtaining information (19-21) associating each of a first and at least one further label with respective sets of first content items. At least one first content item is associated with the first label in response to user input. A second content item is obtained. For each of the first and further labels, a similarity measure is calculated between a feature vector characterising the second content item and each of the feature vectors characterising first content items associated with the label. The first label is associated with the second content item upon determining that the second content item is similar to the first content items associated with the first label, according to calculated values of the similarity measure.

19 Claims, 5 Drawing Sheets

METHOD OF ORGANISING CONTENT ITEMS

FIELD OF THE INVENTION

The invention relates to a method of organising content items.

The invention also relates to a device for organising content items.

The invention also relates to a computer programme.

BACKGROUND OF THE INVENTION

U.S. Pat. No. 5,918,223 discloses a means for finding audio data files or segments of digital audio that sound similar to given sounds, or that sound similar to predefined classes of sounds. The system first measures a variety of acoustical features of each sound file. It measures the loudness, bass, pitch, brightness, bandwidth and Mel-frequency cepstral coefficients at periodic intervals over the length of the sound file. Then it computes specific statistical measurements, namely the mean and standard deviation of each of these features, to describe their variation over time. This set of statistical measurements is represented as an N-vector, also known as a feature vector. The user can create classes of sounds by specifying a set of sound files that belong to this class. In this case, the user selects samples of sounds that demonstrate the properties of sounds that demonstrate the property the user wishes to train. Each of the sample sounds are then used to compute an average vector for the set, $\mu$, and a normalisation vector for the set, V (The normalisation values are either the standard deviation or range values). These vectors can be stored in separate database which defines categories. Once categories have been defined by providing sets of vectors which have a large degree of the property being defined, then we can compare individual sounds with the categories and come up with a distance measure between a sound and a category. This distance of the example vector A, to a category as defined by $\mu$ and V, is given by:

$$\text{distance} = \sqrt{\Sigma(A[i]-\mu[i]/V[i])^2}; i=0 \text{ to } N-1.$$

The distance can be compared to some threshold value to determine whether the sound is "in" or "out" of the class. If it is known a priori that some acoustic features are unimportant for the class, these can be ignored or given a lower weight in the computation of distance.

A problem of the known method is that the calculated distance is based on the assumption that N-vectors defining a set are distributed evenly around the mean, and that each set is defined by the same number of N-vectors.

SUMMARY OF THE INVENTION

It is an object of the invention to provide a method, device and computer programme of the types mentioned in the opening paragraphs that enable content items to be organised into personal categories relatively accurately.

This object is achieved by the method according to the invention, which includes:

obtaining information associating each of a first and at least one further label with respective sets of a number of first content items, wherein at least one first content item is associated with the first label in response to user input;

obtaining a second content item;

for each of the first and further labels, calculating a similarity measure between a feature vector characterising the second content item and each of the feature vectors characterising first content items associated with the label; and associating the first label with the second content item upon determining that the second content item is similar to the first content items associated with the first label, according to calculated values of the similarity measure.

A content item preferably comprises a recording or a set of linked recordings of a signal or signals representative of at least one of a sound excerpt, a still image or a sequence of images.

Because at least one first content item is associated with the first label responsive to a user input, the method allows for category definitions specific to a particular implementation, as opposed to category definitions based on assignments by test persons of a large number of content items to universally defined categories. A single first content item will very rarely embody all characteristics of a particular category of content items. Therefore, respective sets of a number of first content items are associated with the labels. By calculating a similarity measure between a feature vector characterising the second content item and each of the feature vectors characterising first content items associated with the label, account is taken of any uneven distribution of feature vectors characterising first content items associated with a label over the feature space. Moreover, a criterion for determining that the second content item is similar to the first content items associated with the label can be based on the number of first content items in the set associated with the label.

In an embodiment, a user is allowed to define the first label by means of the user input.

By allowing a user to define a personalized label for a pre-defined or user-composed category, the user can define or enhance personal categories.

The first label may be associated with the second content item by storing information linking the first label to the second content item.

Because the first label is associated with the second content item by storing information linking the first label to the second content item, playlists based on category definitions can be assembled more rapidly, because there is no need to repeat similarity measurements.

An embodiment of the present method for organising content items further includes allowing a user to associate at least one first content item with the first label by means of the user input.

By allowing a user to choose which first content items to associate with a user-defined or pre-defined first label, the user can define or enhance personal categories.

In an embodiment, the first label is associated with the second content item upon determining that the second content item is more similar to the first content item(s) associated with the first label than to the first content item(s) associated with the further labels.

An effect is that it is not necessary to define thresholds for determining whether the second content item should belong to the category corresponding to the first label. The relative criterion is also suitable for implementing a method in which categories are mutually exclusive, in the sense that the second content item can be assigned to only one category. This type of categorisation differs most markedly from methods used to generate playlists by searching for second content items similar to a particular first content item representative of a category. Such methods do not take account of the sizes of clusters of similar content items.

In an embodiment, at least one co-ordinate of each feature vector is obtainable by performing a pre-defined signal analysis on a signal comprised in the content item that is characterised by that feature vector, to determine a parameter value representative of a characteristic of the signal that is perceptible when rendered on a reproduction device.

An effect is that the method is amenable to automation. The determination of similar content items is universal and objective. Only the selection of first content items representing a particular class includes an element of subjectivity.

An embodiment further includes associating with the second content item data representative of at least one value based on the value of the similarity measure between the feature vector characterising the second content item and the feature vectors characterising content items associated with the first label.

An effect is that a relatively refined search for content items that are relevant to a query can be carried out without using a very large number of labels, i.e. very many category definitions. Second content items can be ranked according to how closely they match the first content item(s) associated with the first label, allowing for a refinement of the results of a search targeted at the characteristics represented by the label.

In an embodiment, the first label is associated with the second content item only upon determining that at least one value based on the value of the similarity measure between the feature vector characterising the second content item and the feature vectors characterising content items associated with the label lies within a pre-determined range.

An effect is that the method functions relatively well when a second content item is dissimilar to all other kinds of content items. The range is selectable to ensure that content items dissimilar to all first content items do not have a label associated with them just because the set of first content items associated with that label is least dissimilar.

In an embodiment, the similarity measure is calculated by:
calculating a weighted distance between feature vectors according to the weighted distance measure and
applying a function based on a probability distribution to the calculated weighted distance.

An effect is to provide the potential for adaptation of the similarity measure to different numbers of labels. One can use a probability distribution with a smaller spread where a large number of further labels with associated sets of first content items exists.

In an embodiment, the function based on a probability distribution is parameterised across the sets of first content items associated with the first and further labels.

An effect is to take account of differently sized sets of first content items associated with the first and further labels.

In an embodiment, a similarity measure between a feature vector characterising the second content item and any feature vector characterising a content item associated with a label is normalised by a factor dependent on the number $M_c$ of first content items comprised in the set associated with the label.

An effect is that the categorisation is not biased towards categories represented by labels having a large number of first content items associated with them.

In an embodiment, the similarity measure is normalised by a factor inversely proportional to the number $M_c$ of first content items comprised in the set associated with the label, exponentiated with an exponent having a value in the range of zero to one.

This choice of exponent, and in particular a value of about 0.5, accommodates for the fact that, for different categories, different numbers of first content items may be associated with the labels representing the categories. If no normalisation were to be applied, this would result in a strong bias towards labels associated with many first content items, because the function based on the probability distribution would become large at a rate roughly proportional to the number of first content items. In other words, the labels with few content items associated therewith would be very likely to be assigned to the second content item. If the exponent were to be exactly one, then a label having many first content items associated with it would be roughly equally likely to be assigned to the second content item as a label having very few or one first content item associated therewith. This is not what is desired, because the fact that there are more first content items associated with a particular label is a sign that this label represents a favorite category, e.g. a particular preference of a user.

In an embodiment, the function based on a probability distribution includes a variable parameter specifying a width of the probability distribution, wherein the variable parameter is assigned a value depending on the total number of associations between a first content item and the first or a further label.

An effect is that account can be taken of the number of first content items to provide a very fine resolution of feature space or to make sure that the feature space is filled by the different categories. As more first content items are associated with labels, the function based on the probability distribution can be adjusted.

In an embodiment, for a particular one of the first and further labels, the variable parameter is assigned a value that is a function of values of a number of the smallest distances according to the weighted distance measure between pairs of feature vectors in the set of first content items associated with that label.

Thus, where relatively many first content items are associated with each label, the parameter becomes representative of the distances that are typically observed between feature vectors characterising those first content items.

In an embodiment, the variable parameter is a function of an average distance according to the weighted distance measure between arbitrary pairs of all feature vectors characterising the first content items associated with the first or a further label.

An effect is that the parameter value can be based on empirical values of the distance between feature vectors characterising first content items in a set associated with a label, even under circumstances where actually very few first content items have been associated with the first and/or the further labels.

An embodiment of the method includes calculating the similarity measure using a weighted distance measure differentiating between coordinates of the feature vectors and based on a feature weighting matrix obtainable by
obtaining a training set of feature vectors, each characterising one of a plurality of content items,
each of the feature vectors being comprised in at least one of a plurality of sub-sets, and
populating the weighting matrix with values optimised such that pairs of feature vectors comprised in a common sub-set will have a large weighted distance relative to pairs of feature vectors comprised in disjoint sub-sets.

An effect is that the distance measure incorporates information quantifying the different feature vector co-ordinates as a predictor of category membership very accurately. It can be based on a very large training set. The method itself can be carried out on relatively small collections of content items, yet be adapted to implementation-specific category definitions and yield good categorisation results.

According to another aspect, a device for organising content items according to the invention includes electronic circuitry, the electronic circuitry being operative to:

associate at least one first content item with a first label in response to user input, obtain information associating each of at least one further label with respective sets of a number of first content items;

obtain a second content item;

for each of the first and further labels, calculate a similarity measure between a feature vector characterising the second content item and each of the feature vectors characterising first content items associated with the label; and to associate the first label with the second content item upon determining that the second content item is similar to the first content items associated with the first label, according to calculated values of the similarity measure.

The device allows for fast retrieval of content items based on a relatively accurate assessment of the resemblance of one or more of their characteristics to those defining a personal category.

According to another aspect, a device for organising content items according to the invention includes electronic circuitry that, instead of or in addition to being operative to allow a user to define the first label by means of the user input and to cause information linking the first label to the second content item to be stored when associating the first label with the second content item, is operative to calculate the similarity measure using a weighted distance measure differentiating between coordinates of the feature vectors and based on weights that are invariant over the feature vectors characterising first content items associated with the first and further label to which the weighted distance measure is applied.

This device is able to classify content items according to custom-defined categories more effectively by being independent of any category definition. The weighted distance measure give a potentially better classification result, because the weights can be selected to differentiate between categories of a certain type, e.g. categories corresponding to genres or categories corresponding to artists.

In an embodiment, the device is configured to execute a method according to the invention.

According to another aspect, the computer programme according to the invention includes a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
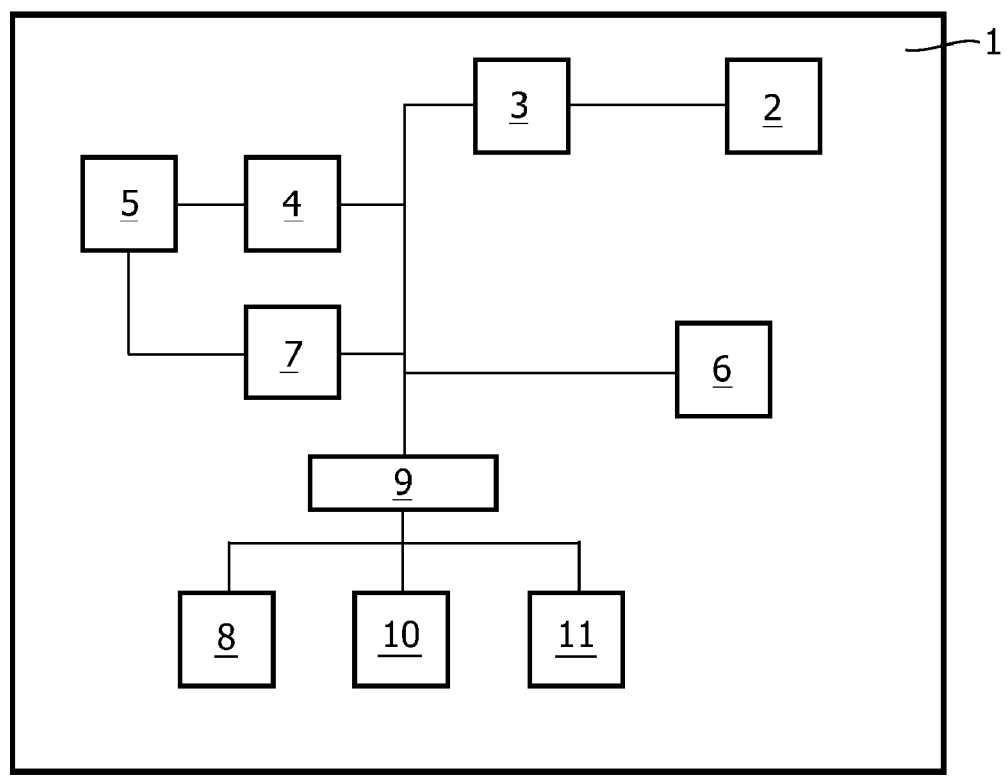
FIG. 1 is a schematic block diagram of a personal music player.

An electronic device 1 is used herein as an example of a reproduction device for rendering a signal comprised in a content item, e.g. a digital audio, video or image signal comprised in a file. The electronic device 1 may be a stationary or a portable device. The electronic device 1 may be a consumer device, e.g. a TV or set top-box, or a professional device. Files are stored in a mass-storage device 2. The mass-storage device 2 may comprise, for example, a hard disk, solid-state memory, an optical disc reader or a holographic storage means. Each stored file further includes metadata.

Data from files are read through an interface 3. The electronic device 1 further includes a processor 4 and random access memory 5 for executing instructions stored in read-only-memory 6, including instructions enabling the portable music player 1 to carry out one or more of the methods described below. For reproduction of signals comprised in content items, the electronic device 1 includes a digital signal processor 7 and a reproduction device 8, provided with data through an input/output interface 9. The reproduction device 8 may comprise, for example, a display and/or a loud speaker. A user is able to provide input through a user interface including an input device 10, e.g. a keyboard and/or scroll buttons, and an output device 11. The input device 10 and output device 11 may comprise, for example, a network connector, e.g. a USB connector or an Ethernet connector, an analogue audio and/or video connector, such as a cinch connector or a SCART connector, or a digital audio and/or video connector, such as an HDMI or SPDIF connector. The input device 10 and output device 11 may comprise a wireless receiver and/or transmitter.

New techniques for distributing and storing content items such as audio information allow users to gather very large music collections. Using such a large music collection to the full benefit becomes a challenge for the user and techniques need to be developed to assist the user in accessing the music collection. Music classification is a technique that allows the user to organise the music collection according to some pre-defined categories such as for example the genres of music, or the moods associated with the music. Automatic music classification systems classify music in one or more categories based on classification models. It is a drawback of known systems that their pre-defined categories often do not match the categories perceived by a user. Although the user can sometimes manually classify his music into personal categories, he needs to do this for his entire music collection, which takes a significant amount of work.

The methods outlined herein provide a method of organising content items, which allows users to define personal classes with a limited amount of effort. The method of organising content items comprises the steps of allowing a user to define a label, allowing the user to associate at least one first content item with the label, searching for second content items, the second content items having similar characteristics as the first content item, and associating the label with the second content items. By using a similarity measure, the first content item (i.e. the seed content item) serves as a prototypical example of the category the user is interested in. Similar songs are highly likely to have a similar music connotation as the seed songs. Thus, this method is already effective with very few seeds songs per category. The same principle can be applied to other types of content items. An additional advantage of using a music similarity measure in the context of personalized classification is that a meaningful measure of similarity to the seed songs is obtained. In this way a rank order can be made of songs that are most likely to be part of the personal category and only the songs that most likely belong to the class can be displayed or, alternatively, the most likely songs can be displayed at the top of the list. Again, the same principle can be applied to other types of content items The composition of the similarity measure will be given in more detail below. The similarity measure is calculated using a weighted distance measure differentiating between co-ordinates of feature vectors $f_x$ characterising the content items. Each co-ordinate of a feature vector $f_x$ is obtainable by performing a pre-defined signal analysis on a signal comprised in the content item that is characterised by that feature vector $f_x$. The analysis yields parameter values representative of characteristics of the signal that are perceptible when the signal is rendered on the reproduction device 8. For an audio signal, examples of feature vector co-ordinates include loudness, bass, pitch, brightness, bandwidth and Mel-frequency cepstral coefficients. For a video signal or still image, contrast, brightness, relative strength of colour components and the frequency of scene changes could be quantified and included as parameters defining the feature vectors $f_x$.

Figure 2:
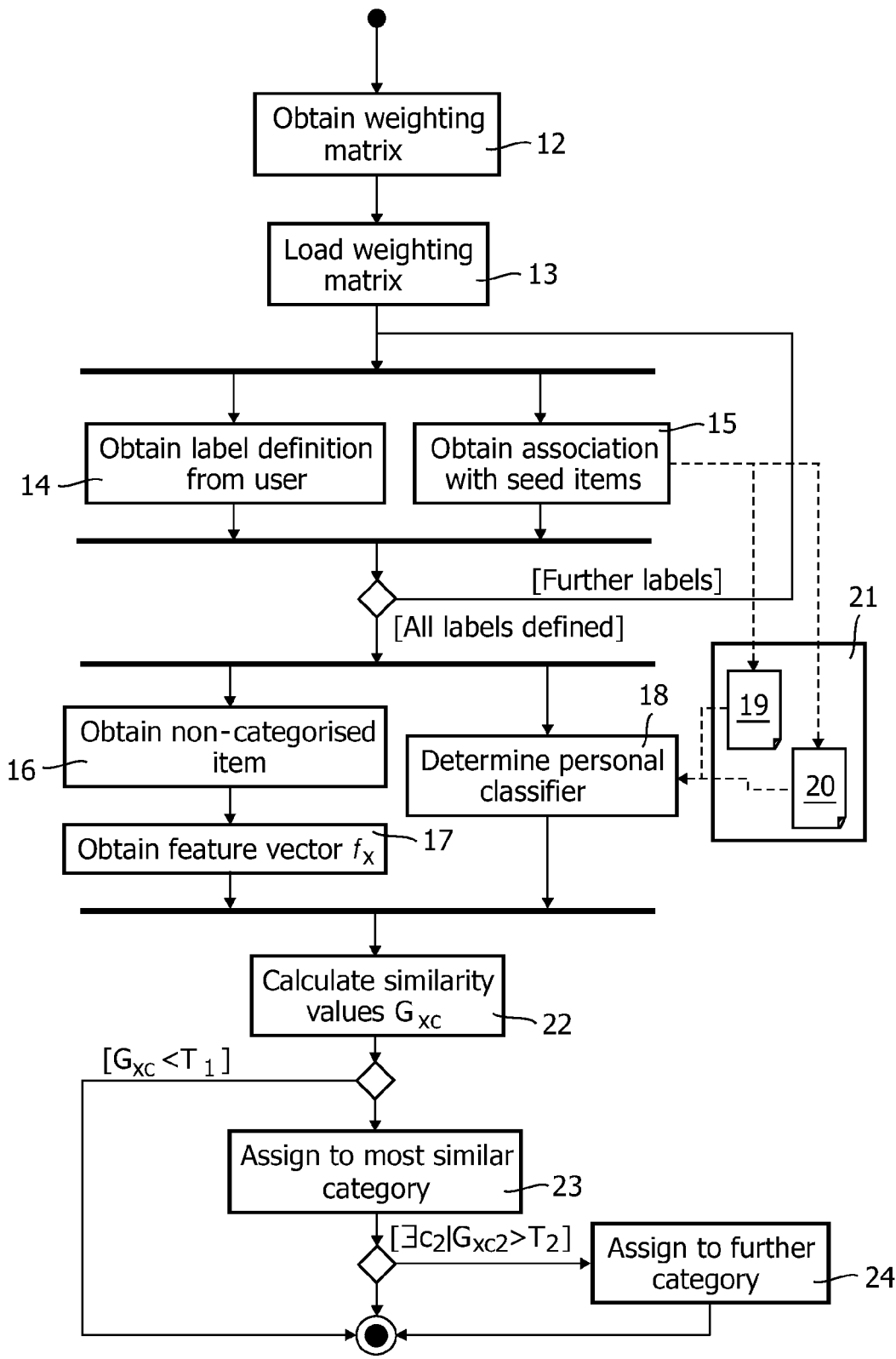
FIG. 2 is a flow chart giving an outline of a method of organising content items.

The weighted distance measure employed in the method of FIG. 2 is based on weights that are independent of the feature vectors characterising the seed items. By this is meant that the weights do not vary according to which set of seed items associated with a label the weighted distance is determined to. Instead, the values of the weights are constant over all labels. In the illustrated embodiment, the weighted distance measure is based on a feature weighting matrix W that is obtainable by means of one of the methods shown in FIGS. 3 and 6. In turn, the feature weighting matrix is calculated on the basis of a training set of feature vectors $f_x$ characterising classified content items in a training database much larger than the collection stored in the mass-storage device 2.

Thus, a first step 12 of the method illustrated in FIG. 2 is generally not carried out in the electronic device 1, but off-line. In variants, the first step 12 may be carried out by the electronic device, using a pre-classified training set loaded into the mass-storage device 2. However, the first step 12 yields better results when carried out on a large training set, such as is typically available in a more powerful data processing system with access to a larger collection of content items, each annotated with extra data identifying, for example, genre classes. The first step 12 is carried out in accordance with one of the methods shown in FIGS. 3 and 6 and will be explained in further detail below.

A second step 13 is typically carried out in the factory producing the electronic device 1. It involves loading data representative of the weighting matrix into memory comprised in the electronic device 1, e.g. into ROM 6 or the mass-storage device 2.

The remaining steps are carried out when a user wishes to categorise the collection of content items accessible to the electronic device 1.

A step 14 comprises allowing a user to define a label. A step 15 comprises allowing the user to associate at least one first content item, or seed content item, with the label. For meaningful categorisation, further labels are obtained, either by repeating the previous two steps 14,15, or by using default labels with associated seed content items, for example pre-set in a factory. A user may also carry out only one of the two steps 14,15. For example, pre-set label identifiers may be used and such labels associated with seed items chosen by the user from his personal collection. Additionally or alternatively, a user may change the identifier of a label already associated with a set of seed items.

A further step 16 includes obtaining a non-categorised, or second content item, that is to be assigned to a category. The electronic device 1 will obtain the feature vector $f_x$ characterising the second content item (step 17). It will either calculate the feature vector $f_x$ by performing signal analyses according to pre-determined algorithms itself, or it will retrieve data representative of a previously calculated feature vector $f_x$ and comprised in or linked by metadata stored with the content item.

A further step 18 comprises building a personalised classifier. Using a collection of content items comprised of songs as an example, the personalised classifier can be built assuming that the following information is available. For each song in the collection, a mean feature vector has been calculated. The mean feature vectors of all songs in the collection are denoted by N vectors $f_1 \ldots f_N$. In addition, the user has specified a number of personalized class descriptors (step 14). For each of the personalised classes, at least one example song has been specified (step 15) and the corresponding mean feature vector should be stored. These example feature vectors will be denoted as $S_{c1} \ldots S_{cM_c}$, where c denotes the class to which the feature vector belongs and $M_c$ is the number of example feature vectors available for class c. The example song feature vectors and their corresponding class labels are represented in FIG. 2 as two arrays 19,20 containing a list of all example items and one containing the corresponding class labels.

As noted, the user can interact with the personalized classifier by giving user input. Via this user input, feature vectors that are available in the music collection are transferred to a classifier data block 21.

Based on the data available in the classifier data block 21, the music collection can be automatically labelled using the personalized classifier. The classification results may then be used to make the music available to the user for playback, if desired, in the form of playlists. Playlists can be generated in a very convenient manner with this invention because for each song a music similarity measure is available that indicates how well the song fits to the category to which it was classified. Based on the similarities available, a rank order can be made with songs that are most similar on top of the playlist. Because the classification results are made available to the user, the user can provide user input to indicate that a song (according to the user's opinion) was incorrectly classified. Thus the user can give user input that leads to an update of the list of example songs in the data block 21.

For each of the songs in the music collection a music similarity measure will be calculated (step 22) using a music similarity measure $G_{xc}$. Here x refers to the song within the music collection; therefore x can range from 1 . . . N and c is the class (represented by a number of example songs) to which the similarity is calculated.

A possible definition of $G_{xc}$ is:

$$G_{xc} = \frac{1}{N} \sum_{k=1}^{M_c} P(D(S_k, f_x)), \qquad (1)$$

where P is a probability density function, N is a normalisation factor, and D is a weighted distance measure denoting the similarity of the feature vector pair $S_k$ and $f_x$. This measure has the basic form:

$$D(S_k, f_x) = (S_k - f_x)^T W (S_k - f_x), \quad (2)$$

where W is a weighting matrix. This distance measure will tend to have a small value when the music is very similar. As mentioned, the matrix W is best given based on a pre-defined database, but it may also be computed from the example songs that are available.

The classification of a particular feature vector $f_x$ is then obtained (step 23) by simply looking for the class where $G_{xc}$ is maximum, given $f_x$:

$$\text{class}_x = \underset{c}{\arg\max}\, G_{xc} \quad (3)$$

Note that this manner of classification results in mutually exclusive categories, i.e. each song can only belong to a single category. Alternatively, it may sometimes be preferable that a song belongs to more than one category. In that case a category can be filled with all songs for which:

$$G_{xc} > \Delta, \quad (4)$$

where $\Delta$ represents an appropriately chosen criterion value.

The function P in Eq. 1 is used to cast the music similarity in terms of a probability that the music sounds similar to the example song. It is defined such that if the music is very similar (and D is very small) P will be large, but when the music is dissimilar (and D is large) P will approach zero. Using a Gaussian probability density function leads to the following expression for $G_{xc}$:

$$G_{xc} = \frac{1}{N} \sum_{k=1}^{M_c} \frac{1}{\sigma\sqrt{2\pi}} e^{-\frac{D(S_k, f_x)^2}{2\sigma^2}}, \quad (5)$$

where $\sigma$ is the parameter specifying the width of the Gaussian distribution. Although there is freedom in the choice of the parameters N and $\sigma$, experience has taught us that using a value for $\sigma$ that is about 20% of the average value of D that is observed for arbitrary pairs of feature vectors works well. It allows for a sufficient spread of the probability density function to make sure that the influence of an example song spreads across a reasonably large part of the feature space while it is small enough to have sufficient resolution in the feature space to distinguish between dissimilar and similar pairs of feature vectors.

In addition, using $N=\sqrt{M_c}$ turned out to be a very useful choice. It accommodates for the fact that for different categories, different numbers of example songs may be provided by the user. If no normalisation would be applied, this would result in a strong bias towards classes that have many example feature vectors because the probability density function would become larger at a rate roughly proportional to the number of example songs. In other words, the classes with few example songs are very likely to occur. If the normalisation would be $N=M_c$, a category with very many example songs would be roughly equally likely to occur as a category with only one example song. This is not what is desired because now the number of example songs per category cannot be used at all as a means to more densely populate certain categories with songs. The fact that there are more example songs in one class can be seen as a sign that the user wants to have more songs classified into this category. The definition $N=\sqrt{M_c}$ turned out to be a good manner to overcome the problems indicated above.

It is worth making the parameter $\sigma$ variable, depending on the number of example songs that are available. The basic idea is that as long as there are very few example songs, the parameter $\sigma$ should be chosen large enough such that it fills the feature space, but it should be small enough that differences between classes can still be resolved. By choosing $\sigma$ relatively large, the probability functions of different example songs for the same class will tend to heavily overlap. Thus, implicitly it is assumed that the class does not exist of different (non-overlapping) clusters in the feature space simply because from the limited amount of data the necessary information about the existence of such clusters cannot be derived.

When more and more example songs are available for each class, there starts to be enough information to distinguish clusters of feature vectors within one class. In principle, when there are clusters, $\sigma$ should be of a magnitude comparable to distances that are typically observed within the cluster. In order to make an estimate of the typical distance within a cluster, the $\sqrt{M_c}$ smallest distances that are observed between pairs of feature vectors within one class are used to estimate the value of $\sigma$.

The two manners with which to derive $\sigma$, i.e. the cases with few and many example songs, can be combined by making a weighted sum between $\sigma$'s derived according to both manner where the weights depend on the number of example songs.

The step 23 of assigning a content item to be categorised to the most similar category involves storing data representative of the label denoting that category as metadata linked to or comprised in the content item. In addition, data representative of the calculated value of the similarity measure $G_{xc}$ to the seed items defining the category may be similarly stored. Alternatively or additionally, the weighted distance $D(S_k, f_x)$ can be stored. Thus, a similarity measure is available that indicates how well the categorised content item fits into the category. Based on the similarities available, a rank order can be made in response to a search query targeted at content items within a particular category. An example of such a search query is a command to determine a playlist.

It may happen that the content item to be categorised does not fit well into any of the user-defined categories. As illustrated in FIG. 2, the content item is only assigned to the most similar category if the similarity value $G_{xc}$ for the most similar category is within a pre-determined range, above a first threshold value $T_1$ (The similarity measure, in contrast to the distance measure, is defined such that higher values indicate a higher degree of similarity). If the similarity value $G_{xc}$ for the most similar category lies below the first threshold value $T_1$, the content item is not assigned to any category.

Conversely, it may happen that the user-defined categories are not completely mutually exclusive, or that they lie relatively close together in feature space. As illustrated in FIG. 2, the content item is associated (step 24) with at least one other label than the one representing the most similar category. This is done only if the similarity measure between the feature vector $f_x$ characterising the second content item and the feature vector $S_{c2}$ characterising the category of the other label(s) lies within a pre-determined range, above a second threshold value $T_2$.

Figure 3:
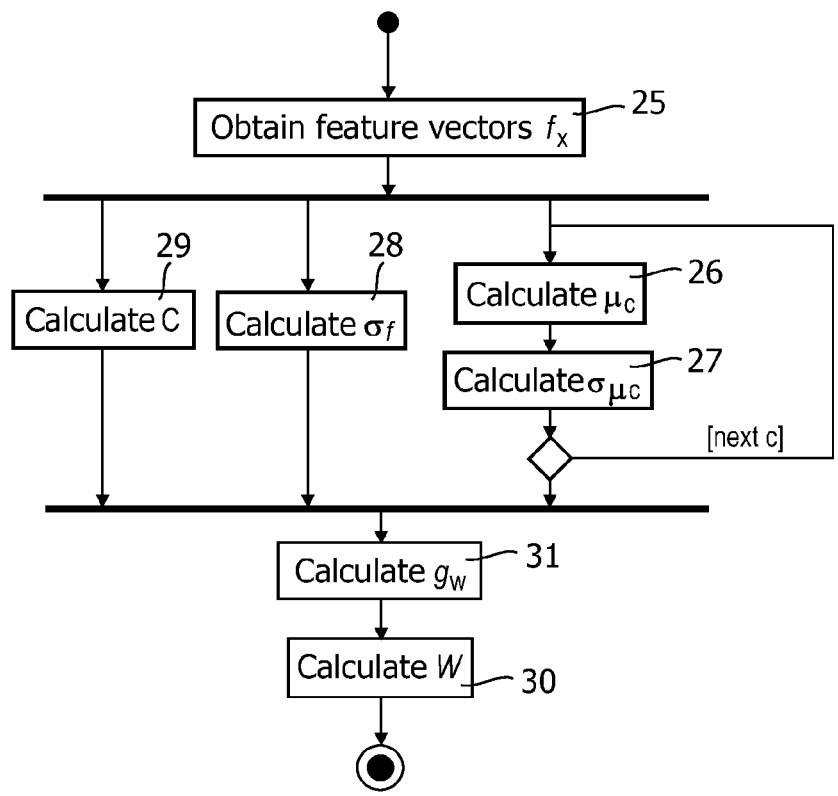
FIG. 3 is a flow chart giving an outline of a first method of providing a feature weighting matrix for use in the method of FIG. 2.

A first method of obtaining the feature weighting matrix W will now be explained with reference to FIG. 3. In a first step 25, a training set of feature vectors $f_x$ is obtained. Each feature vector $f_x$ characterises one of a training database of content items, and is obtainable by performing the same analyses as are used to obtain the feature vectors employed in the electronic device 1. In addition, each feature vector $f_x$ is comprised in at least one of a plurality of sub-sets representing categories. It is noted that these categories are generally not the same as those defined in the steps 14,15 of the method illustrated in FIG. 2. However, for good classification results, they should be based on the same property. That is to say that they should be based on genre where the ultimate purpose of the weighting matrix W is to categorise the collection in the electronic device according to user-defined genres. Similarly, the assignment of feature vectors $f_x$ of the training set to sub-sets should be based on artist where the ultimate purpose is to perform an automated form of artist recognition in the electronic device 1. It should be clear that the artists of the content items used to generate the training set need not be the same as those of the seed content items that the user of the electronic device 1 associates with labels defined by him. The purpose of the method of FIG. 3 is merely to generate a weighting matrix W with weights that are specially adapted to providing a categorisation according to a particular property, e.g. artist or genre.

For each sub-set, corresponding to a class c, an average feature vector $\mu_c$ is calculated (step 26). Additionally, the within-class variance $\sigma^2_{\mu c}$ is calculated (step 27). The method also includes calculating (step 28) the variance $\sigma^2_f$ over all feature vectors $f_x$ defining the feature space. The feature weighting matrix W is also populated with values such that the weighted distance calculated using it is dependent on the co-variances between different feature vector co-ordinates. In other words, the feature weighting matrix W is a non-diagonal matrix. To this end, a co-variance matrix C is calculated (step 29) for all feature vectors $f_x$ in the training set. Alternatively, this matrix C may be based on a representative random sample of the training set, to reduce the computational load.

The feature weighting matrix W is calculated (step 30) according to the following equation:

$$W = \overline{gw} \cdot C^{-1} \overline{gw}', \quad (6)$$

where $\overline{gw}$ is a weighting vector that is obtained (step 31) by element-by-element division of a vector representing an average of the within-class variances $\sigma^2_{\mu c}$ by a vector representing the variance $\sigma^2_{\mu c}$ over all feature space, and taking the square root.

The weighting matrix W obtained in this manner is a good classifier if one feature vector co-ordinate is a good predictor of category membership. This would correspond to a situation where sub-sets representing categories are distributed along one dimension of feature space. The method of FIG. 3 takes account of how much the sub-sets are "spread out" along the various dimensions.

Figure 4:
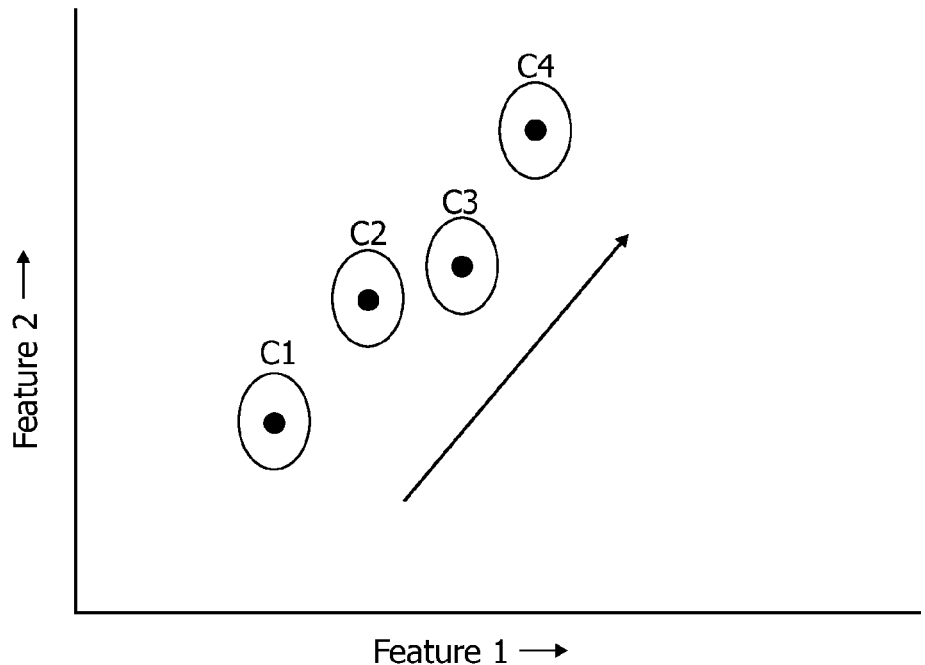
FIG. 4 is a schematic diagram of a first type of distribution in two-dimensional feature space of feature vectors clustered in classes.
Figure 5:
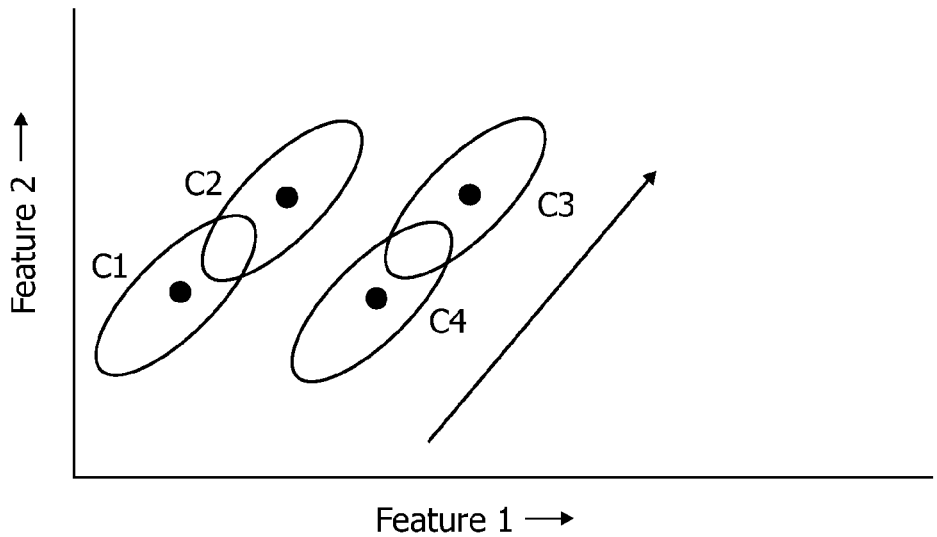
FIG. 5 is a schematic diagram of a second type of distribution in two-dimensional feature space of feature vectors clustered in classes.
Figure 6:
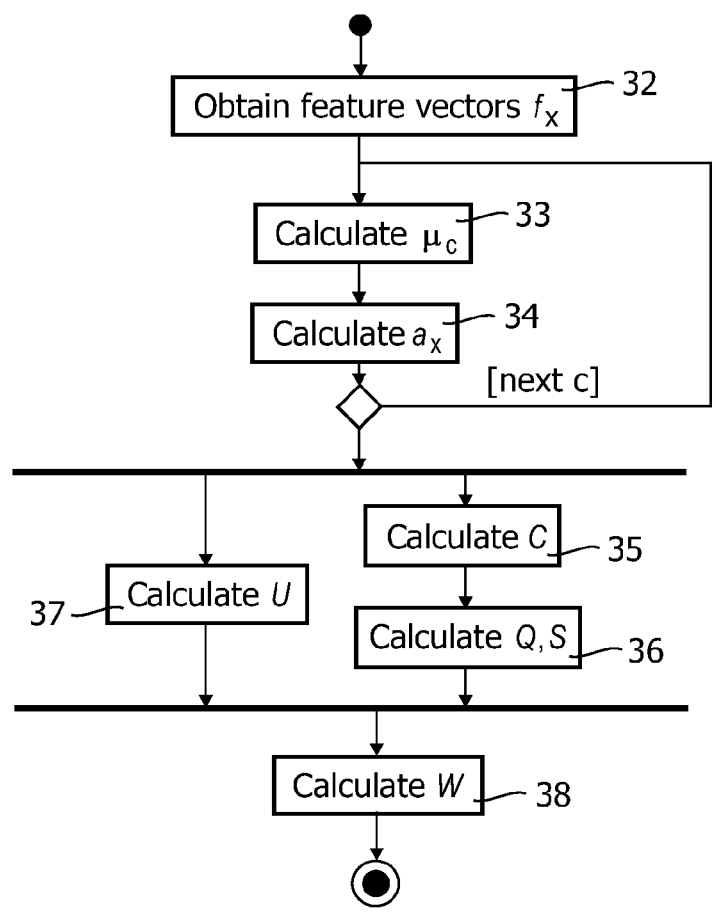
FIG. 6 is a flow chart giving an outline of a second method of providing a feature weighting matrix for use in the method of FIG. 2.

FIGS. 4 and 5 depict an assignment of feature vectors to sub-sets in which a different method, illustrated in FIG. 6, yields a more appropriate weighting matrix.

In FIG. 4, four categories are represented. The solid dots indicate the mean feature vector for the sub-sets, and the circular shapes represent iso-probability contours of different classes. In effect, they indicate the boundaries of the sub-sets. As can be seen, the category means scatter roughly along a line at forty-five degrees. The contribution of each individual feature to the distinction between categories is equal. The method illustrated in FIG. 3 will therefore weight features 1 and 2 equally. It is clear, however, that feature vectors that differ in the direction indicated by the arrow are more likely to belong to different sub-sets than feature vectors that differ in a direction perpendicular thereto. For this reason, the feature weighting matrix W obtained using the method of FIG. 6 is populated with values that are a function of the co-variance between mean values of a pair of different feature co-ordinates per sub-set.

In FIG. 5, four categories are again represented. This time, however, the feature vectors within a sub-set are not evenly distributed over feature space. The variance within a particular sub-set is larger in the direction of the arrow than in the direction perpendicular to the arrow. Feature vectors that differ with respect to one another in the direction of the arrow are less certain to be in different sub-sets—correspond to different categories—than feature vectors that differ in a direction perpendicular to the arrow. For this reason, the feature weighting matrix W obtained using the method of FIG. 6 is populated with values that are a function of the co-variance between pairs of different feature vector co-ordinates within a sub-set, averaged over the sub-sets.

Before explaining the steps illustrated in FIG. 6, it is useful to explain the theoretical background.

It is assumed that a training set of N feature vectors $f_x$ characterising N content items is available. It is further assumed, for simplicity, that the feature vectors $f_x$ are defined such that the mean of all feature vectors $f_x$ is equal to the zero vector. This can always be achieved by subtracting an appropriate vector. Assume also that the feature vectors $f_x$ have K components.

The feature vectors $f_x$ have been assigned to sub-sets representing M labelled categories. Below, $c(f_x)$ denotes the category of feature vector x. A mean feature vector $\mu_{Cx}$ can be derived for each sub-set.

To simplify the following explanation, define a zero-category-mean feature vector $a_x$ as:

$$a_x = f_x - \mu_{c(f_x)} \quad (7)$$

where $\mu_{c(f_x)}$ denotes the mean feature vector for the category associated with $f_x$. The zero-category-mean feature vectors $a_x$ will help in ensuring that the within-category (co-)variances for each component of the feature vector $a_x$ are equal. All categories are associated with a mean feature vector $\alpha_c$ equal to the zero vector.

One can now fill a K×N matrix A with all N zero-category-mean feature vectors $a_x$. Having the matrix A and knowing that the set of all feature vectors $a_x$, x=1 . . . N, has zero mean value, a within-category covariance matrix C of the zero-category-mean feature vectors $a_x$ can be calculated as follows:

$$C = AA^T \quad (8)$$

The within-category covariance matrix C is symmetric, and therefore, the following singular value decomposition can be made of C:

$$C = QSQ^T \quad (9)$$

where Q is a unitary matrix containing the eigenvectors of C, and S is a diagonal matrix containing the respective eigenvalues of C. From equations (8) and (9), it follows that:

$$S = Q^T AA^T Q \Leftrightarrow I = \underbrace{S^{-\frac{1}{2}} Q^T A}_{B} \underbrace{A^T Q S^{-\frac{1}{2}}}_{B^T} \Rightarrow BB^T = I, \quad (10)$$

where $$S_{ij}^{-\frac{1}{2}} = \sqrt{S_{ij}}, \text{ and } B = S^{-\frac{1}{2}} Q^T A.$$

As can be seen, the matrix B has a covariance matrix that is equal to the identity matrix. Therefore, transformed feature vectors $$b_x = S^{-\frac{1}{2}} Q^T a_x$$

within matrix B have zero covariance and unity variance. The transformation $a_x \to b_x$ transforms a zero-category-mean feature vector $a_x$ to whitened feature space, in which feature vectors belonging to one category have zero covariance and unity variance, assuming that each class produces an approximately similar co-variance matrix.

The exposition continues with feature vectors and mean feature vectors transformed to whitened feature space:

$$g_x = S^{-\frac{1}{2}} Q^T f_x \quad (11)$$

$$\omega_{Cx} = S^{-\frac{1}{2}} Q^T \mu_{Cx} \quad (12)$$

The application of this transformation and the derivation of a weighting matrix W based on it has the effect that the resulting weighted distance measure takes (co-)variances within a category into account. Thus, the measure yields better results for the elliptically shaped feature vector distributions illustrated in FIG. 5, regardless of the direction in which the mean vectors µ are distributed in feature space.

Independently of this, the values with which the feature weighting matrix is populated are also a function of the co-variance between mean values of a pair of different feature vector co-ordinates per sub-set (the "across-category" co-variance). This will become clear from the explanation of the theoretical background that now follows.

The idea is to construct a difference matrix T between feature vectors $g_x$ and $g_y$ and to apply a norm to the difference matrix that is based on the difference between the expected value for pairs of feature vectors belonging to different categories and pairs of feature vectors belonging to the same class.

The difference matrix T can be written as follows:

$$T = (g_x - g_y)(g_x - g_y)^T \quad (13)$$

The expected value for pairs of feature vectors belonging to different categories is, using element-by-element notation:

$$\langle T_{xy}(i,j) \rangle_a = \frac{1}{L} \sum_{x=1}^{N} \sum_{y|c(g_x) \neq c(g_y)} (g_x(i) - g_y(i))(g_x(j) - g_y(j)), \quad (14)$$

where L is the total number of elements of the first and second summation together, equating to the number of pairs of feature vectors that belong to different categories.

Equation (14) can be re-written as:

$$\langle T_{xy}(i,j) \rangle_a = \frac{1}{L} \sum_{x=1}^{N} \sum_{y|c(g_x) \neq c(g_y)} \left( \begin{array}{c} g_x(i) g_x(j) + g_y(i) g_y(j) - \\ g_x(i) g_y(j) - g_y(i) g_x(j) \end{array} \right). \quad (15)$$

The following first approximation is applied:

$$\langle T_{xy}(i,j) \rangle_a \approx \frac{2}{N} \sum_{x=1}^{N} g_x(i) g_x(j) - \frac{2}{L} \sum_{x=1}^{N} g_x(i) \sum_{y|c(g_x) \neq c(g_y)} g_y(j) \quad (16)$$

The second of the two terms subsumes the cross-products in equation (14), which are assumed to have approximately the same average value. This assumption is valid for training sets where there are many more pairs of feature vectors that belong to different categories than there are pairs belonging to the same category. In fact, the last term is approximately zero, because the feature vectors have been defined such as to have zero mean value over all vectors in the training set ($a_x$ has been defined in this way, and the transformation to whitened feature space does not change this property). The mean across all feature vectors except those belonging to a particular category is approximately zero as well. From this follows the expected value of the difference matrix for a pair of feature vectors belonging to different categories:

$$\langle T_{xy}(i,j) \rangle_a \approx \quad (17)$$

$$\frac{2}{N} \sum_{x=1}^{N} g_x(i) g_x(j) - \underbrace{\frac{2}{L} \sum_{x=1}^{N} g_x(i) \sum_{y|c(g_x) \neq c(g_y)} g_y(j)}_{\approx 0} \approx \frac{2}{N} \sum_{x=1}^{N} g_x(i) g_x(j)$$

One can re-write the feature vectors in whitened feature space as the sum of a mean feature vector $\omega_{c(g_x)}$ and a disturbance $\epsilon_x$:

$$g_x = \omega_{c(g_x)} + \epsilon_x \quad (18)$$

The expected value of the difference matrix T for a pair of feature vectors belonging to different categories then becomes:

$$\langle T_{xy}(i,j) \rangle_a \approx \frac{2}{N} \sum_{x=1}^{N} \left[ \begin{array}{c} \omega_{c(g_x)}(i) \omega_{c(g_x)}(j) + \omega_{c(g_x)}(j) \epsilon_x(i) + \\ \omega_{c(g_x)}(i) \epsilon_x(j) + \epsilon_x(i) \epsilon_x(j) \end{array} \right] \quad (19)$$

The disturbance has a mean value of zero for each category. Using this fact, the expectation value becomes:

$$\langle T_{xy}(i,j) \rangle_a \approx \frac{2}{N} \sum_{x=1}^{N} \omega_{c(g_x)}(i) \omega_{c(g_x)}(j) + \frac{2}{N} \sum_{x=1}^{N} \epsilon_x(i) \epsilon_x(j) \quad (20)$$

The expectation value of the difference matrix between a pair of feature vectors belonging to the same category is defined as follows:

$$\langle T_{xy}(i,j) \rangle_w = \frac{1}{L} \sum_{x=1}^{N} \sum_{y|c(g_x) = c(g_y)} \left[ \begin{array}{c} \epsilon_x(i) \epsilon_x(j) + \epsilon_y(i) \epsilon_y(j) - \\ \epsilon_x(i) \epsilon_y(j) - \epsilon_y(i) \epsilon_x(j) \end{array} \right] \quad (21)$$

If one assumes that the number of feature vectors per category is roughly the same for each category and that the co-variances of feature elements are not category-dependent, one can re-write equation (21) as:

$$\langle T_{xy}(i,j)\rangle_w \approx \frac{2}{N}\sum_{x=1}^{N}[\varepsilon_x(i)\varepsilon_x(j)] + \frac{1}{L}\sum_{x=1}^{N}-\varepsilon_x(i)\sum_{y|c(g_x)=c(g_y)}\varepsilon_y(j) + \frac{1}{L}\sum_{x=1}^{N}-\varepsilon_x(j)\sum_{y|c(g_x)=c(g_y)}\varepsilon_y(i),\quad (22)$$

so that the final expression becomes:

$$\langle T_{xy}\rangle_w \approx \frac{2}{N}\sum_{x=1}^{N}\varepsilon_x(i)\varepsilon_y(j)\quad (23)$$

Using equations (20) and (23), one can write the difference between the expectation value of the difference matrix for a pair of feature vectors belonging to different categories and the expectation value for a pair of feature vectors belonging to the same category as:

$$\langle T_{xy}(i,j)\rangle_a - \langle T_{xy}(i,j)\rangle_w \approx \frac{2}{N}\sum_{x=1}^{N}\omega_{c(g_x)}(i)\omega_{c(g_x)}(j)\quad (24)$$

This equation is used to define a norm for determining whether two feature vectors $g_k$ and $g_l$ belong to the same or different categories. The norm is obtained from optimal detection theory. One can write a signal Y[n] as the sum of a signal $X_S[n]$ to be detected and a stochastic noise signal $X_N[n]$. If the noise signal is a constant variance, white Gaussian distributed signal with a mean equal to zero for each value of n, then an optimal detector is obtained using a matched filter that is equal to the signal $X_S[n]$. Applying this to the problem at issue, such a noise signal is:

$$X_N[n]=T_{kl}(i,j)-\langle T_{xy}(i,j)\rangle_w\quad (25)$$

where n enumerates all combinations of i and j, and where $X_N[n]$ is assumed to have zero mean, due to the subtraction of the last term in equation (25). The signal to be detected is:

$$X_S[n]=\langle T_{xy}(i,j)\rangle_a - \langle T_{xy}(i,j)\rangle_w\quad (26)$$

The filter equation thus becomes:

$$D'_{kl} = \frac{N}{2}\sum_i\sum_j\left[T_{kl}(i,j)-\langle T_{xy}(i,j)\rangle_w\right]\begin{bmatrix}\langle T_{xy}(i,j)\rangle_a -\\ \langle T_{xy}(i,j)\rangle_w\end{bmatrix},\quad (27)$$

which may be written as:

$$D'_{kl} = \frac{N}{2}\sum_i\sum_j T_{kl}(i,j)\begin{bmatrix}\langle T_{xy}(i,j)\rangle_a -\\ \langle T_{xy}(i,j)\rangle_w\end{bmatrix} - \frac{N}{2}\sum_i\sum_j\langle T_{xy}(i,j)\rangle_w\begin{bmatrix}\langle T_{xy}(i,j)\rangle_a -\\ \langle T_{xy}(i,j)\rangle_w\end{bmatrix}\quad (28)$$

The last term in equation (28) being constant, a more convenient distance measure is:

$$D_{kl} = \frac{N}{2}\sum_i\sum_j T_{kl}(i,j)[\langle T_{xy}(i,j)\rangle_a - \langle T_{xy}(i,j)\rangle_a]\quad (29)$$

Using equation (13), one obtains:

$$D_{kl} = \frac{N}{2}\sum_i\sum_j(g_k(i)-g_l(i))(g_k(j)-g_l(j))\begin{bmatrix}\langle T_{xy}(i,j)\rangle_a -\\ \langle T_{xy}(i,j)\rangle_w\end{bmatrix}\quad (30)$$

Inserting equation (24), one obtains:

$$D_{kl} \approx \sum_i(g_k(i)-g_l(i))\sum_j\sum_x\omega_{c(f_x)}(i)\omega_{c(f_x)}(j)(g_k(j)-g_l(j))\quad (31)$$

It is convenient to define a matrix $\Omega$, with $\Omega(i,j)=\omega_j(i)$, the i-th element of the j-th transformed feature vector, j=1 ... N, i=1 ... K. Using this definition, the weighted distance measure becomes (in whitened feature space):

$$D_{kl}=(g_k-g_l)^T\Omega\Omega^T(g_k-g_l)\quad (32)$$

The embodiment of the method of calculating the feature weighting matrix W results in a feature weighting matrix to be applied to the original feature vectors $f_x$. Using the definitions of $\omega$ and g, one can re-write equation (32) as follows:

$$D_{kl} = (f_k-f_l)^T QS^{-\frac{1}{2}}\Omega\Omega^T S^{-\frac{1}{2}}Q^T(f_k-f_l)\quad (33)$$
$$= (f_k-f_l)^T QS^{-\frac{1}{2}}S^{-\frac{1}{2}}Q^T UU^T QS^{-\frac{1}{2}}S^{-\frac{1}{2}}Q^T(f_k-f_l)$$
$$= (f_k-f_l)^T \underbrace{QS^{-1}Q^T U}_{V}\underbrace{U^T QS^{-1}Q^T}_{V^T}(f_k-f_l)$$

The weighting matrix W of Equation (2) thus becomes:
$$W=VV^T\quad (34)$$

wherein $$V=QS^{-1}Q^T U\quad (35)$$

U is a matrix formed of the mean feature vectors of all the categories, defined as $U(i,j)=\mu_j(i)$, the i-th element of the mean feature vector for the j-th category.

FIG. 6 illustrates how the actual calculation of the weighting matrix W on the basis of a given training set of feature vectors $f_x$ may be carried out. In a first step 32 the training set of categorised feature vectors is obtained. For each sub-set of feature vectors corresponding to a category, the mean feature vector $\mu_c$ is calculated (step 33). Subsequently, the feature vectors $f_x$ are transformed (step 34) in accordance with equation (7), to obtain zero-category-mean feature vectors $a_x$. These steps 33,34 are repeated for each category.

The within-category covariance matrix C is calculated (step 35) in accordance with equation (8). The matrices Q, S are calculated (step 36) in accordance with equation (9) by applying an algorithm for singular value decomposition. Such algorithms are known per se, and not described in detail herein.

Concurrently or consecutively, the matrix U of all mean feature vectors is formed (step 37). Then, the feature weighting matrix is determined (step 38) in accordance with equations (34) and (35). The feature weighting matrix W can be loaded into the memory of the electronic device 1 at its production, for instance.

In the above, the example of the electronic device 1 has been used, with the method of organising content items being applied to categorise a personal collection stored on the mass-storage device 2. Another use of all of the above methods is in the determination of the source of a sound, e.g. a voice. In such an embodiment, one of the methods of FIGS. 3 and 6 is applied to a training set of feature vectors characterising sound recordings from different sources. Feature vectors characterising sound excerpts from the same source are grouped into sub-sets. Thus, the categories correspond to sound sources. The weighting matrix W resulting from the application of either method will be optimised for distinguishing between different sources of sound, for example different speakers.

Figure 7:
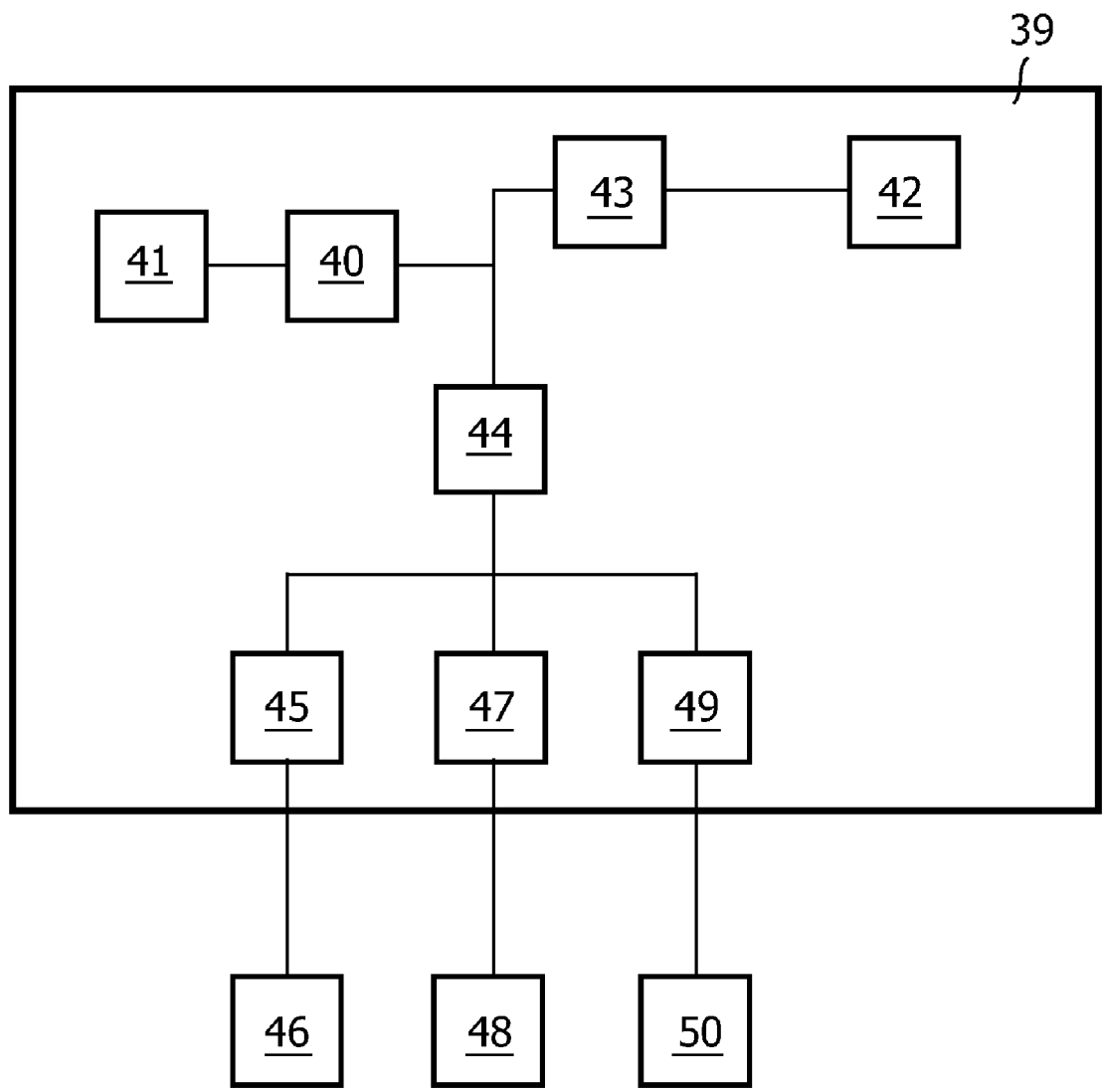
FIG. 7 is a block diagram of a personal computer set up for recognising the sources of sounds by means of a variant of the method illustrated in FIG. 2.

FIG. 7 illustrates schematically a computer 39 provided with sound recognition software. The computer 39 includes a data processing unit 40 and main memory 41. The software is provided on a disk drive 42 from which instructions are loaded into the main memory 41 via an interface 43. A chip set 44 forms an interface to an interface 45 to an input device 46, e.g. a keyboard, to an interface 47 to an output device 48, e.g. a visual display unit, and to a sound card 49. The sound card 49 has an input for a microphone 50 for capturing sound excerpts.

The sound recognition software installed on the computer 39 comprises or is operative to retrieve data representative of the feature weighting matrix W. The software is also operative, responsive to user input, to obtain at least one sample sound excerpt from each of a first and at least one further source, and to associate labels to feature vectors characterising these excerpts. The labels are indicative of the source from which the sound excerpt was obtained. Depending on the implementation, a user may be allowed to define the labels by means of user input provided via the input device 46. In this way, the computer 39 is set up to recognise sounds from any one of the sources associated with a label.

In a subsequent phase, a sound excerpt from an unknown source is captured and a feature vector characterising it determined. Using a method matching that depicted in FIG. 2, the most likely source is determined by, for each of the first and further labels, calculating a similarity measure between the feature vector characterising the sound excerpt from the unknown source and the feature vector or vectors—more than one may be available for a particular source—characterising sound excerpts associated with the label. The similarity measure is calculated using the weighted distance measure based on the feature weighting matrix. The computer 39 determines the source of the new sound excerpt by determining that the new sound excerpt is more similar to the sound excerpt or excerpts associated with a particular one of the labels than to the sound excerpt or excerpts associated with any of the other labels. An appropriate output referring to this particular one of the labels is provided on the output device 48.

As in the embodiment illustrated in FIG. 2, the sound recognition software may be configured to assign the sound excerpt from the unknown source to the most similar known source only if the similarity value $G_{xc}$ for the most similar source is within a pre-determined range, below a first threshold value $T_1$ (recall that higher values indicate a higher degree of dissimilarity). If the similarity value $G_{xc}$ for the most similar category lies above the first threshold value $T_1$, the computer 39 would indicate to the user that the new sound excerpt is most probably not from one of the previously known sources.

The separation between the stage of deriving an optimal feature weighting matrix—for which a relatively large training set can be used—and providing sample items associated with labels at the point of deployment has the same effect when applied to sound recognition as when applied to categorisation of personal collections of content items. Small numbers of sample content items are sufficient at the point of deployment to yield good categorisation results. The quality is assured by using the most appropriate weights in the applied weighted distance measure.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer program' is to be understood to mean any software product stored on a computer-readable medium, such as an optical disk, downloadable via a network, such as the Internet, or marketable in any other manner.

There have been described herein a method, device and computer programme that are suitable for carrying out a classification of content items based on a prior classification of a relatively small corpus of content items.

The method of organising content items includes:

obtaining information associating each of a first and at least one further label with respective sets of at least one first content item, wherein at least one first content item is associated with the first label in response to user input;

obtaining a second content item;

for each of the first and further labels, calculating a similarity measure between a feature vector characterising the second content item and at least one feature vector characterising first content items associated with the label; and associating the first label with the second content item upon determining that the second content item is similar to the first content item(s) associated with the first label according to calculated values of the similarity measure, wherein the similarity measure is calculated using a weighted distance measure differentiating between coordinates of the feature vectors. Characteristically, the weighted distance measure is based on weights that are invariant over the feature vectors characterising first content items associated with the first and further label to which the weighted distance measure is applied.

Because the similarity measure between a feature vector characterising the second content item and at least one feature vector characterising content items associated with a label is calculated for each of the first and further labels, true categorisation is achieved, in that all candidate categories are evaluated. Because the first label is associated with the second content item upon determining that the second content item is similar to the first content item(s) associated with the first label, categorisation is achieved in a relatively simple manner on the basis of a small sample of content items, or even merely one. These first content items, defining categories or classes, are referred to hereinafter as "seed items". In particular, the method does not require statistical functions characterising feature space for the classification of new content items. Because the values of the similarity measure are calculated using a weighted similarity measure differentiating between coordinates of the feature vectors, a better classification result can be obtained. In particular, the method provides the potential for "training" the similarity measurement on the basis of a large corpus of content items classified by test persons, in order to use weighting values appropriate to the type of classification to be implemented. For example, weights can be chosen to provide a similarity measurement geared towards discerning between genres of music. Because the weighted distance measure is based on weights that are independent of the feature vectors characterising the first content items, the "training" phase can be carried out "off-line", i.e. based on a separate and much larger universal collection of content items, in order to provide a classifier geared to a particular purpose, i.e. voice recognition, genre classification, mood classification, artist classification, etc. The association of a first and at least one further label with a respective set of at least one first content item allows for personalised genre definitions, mood definitions, artist definitions, etc., which are independent of the class definitions used to obtain the weights comprised in the weighted distance measure. Thus, the method embodies the realisation that a weighted distance measure, to be simple to use and accurate, should be dependent on the type of classification rather than the classes. A class-independent weighted distance measure is simple to implement in conjunction with user-defined classes, which are a priori unknown. Such a measure does not require adjustment of the weights on the basis of some user-input.

This embodiment addresses another problem of the method known from U.S. Pat. No. 5,918,223, which is that it only produces good results if it is based on a relatively large selection of samples characterising a particular property that the user wishes to train. As a consequence, it is less suitable for carrying out a classification personalised to a particular listener and based on category definitions provided by means of a small set of samples. A class-dependent weighting of the distance computation is almost impossible to implement in a consumer device in a way that makes it simple to use and gives accurate results.

There has also been described herein a method of providing a feature weighting matrix for use in a method of organising content items according to the invention, including obtaining a training set of feature vectors, each characterising one of a plurality of content items, each of the feature vectors being comprised in at least one of a plurality of sub-sets, and populating the weighting matrix with values optimised such that pairs of feature vectors comprised in a common sub-set will have a large weighted distance relative to pairs of feature vectors comprised in disjoint sub-sets.

In an embodiment, the weighting matrix is populated with values such that a feature vector co-ordinate is weighted by at least one factor that is a function of at least one of the variance in value of that feature vector co-ordinate over all feature vectors comprised in the training set, and the variance in mean value of that feature vector co-ordinate per sub-set.

An effect is that dimensions of feature space that are important for distinguishing between categories of content items are given more weight.

In an embodiment, the weighting matrix is populated with values such that a feature vector co-ordinate is weighted by at least one factor that is a function of the variance in mean value of that feature vector co-ordinate per sub-set divided by the variance in value of that feature vector co-ordinate over all feature vectors comprised in the training set.

An effect is that features that vary greatly in value between sub-sets compared to their variation over the entire training set are weighted more heavily.

In an embodiment, the weighting matrix is populated with values such that the weighted distance is dependent on the co-variances between different feature vector co-ordinates.

An effect is that, where two features vary relatively greatly, but always in a concerted fashion, the weights assigned to these features are not too small relative to their suitability for predicting sub-set membership.

In a variant, the weighting matrix is populated with values that are a function of the co-variance between mean values of a pair of different feature vector co-ordinates per sub-set.

An effect is to enable more accurate similarity measures to be provided when certain combinations of feature vector co-ordinates are good predictors of sub-set membership.

In a variant, the weighting matrix is populated with values that are a function of the co-variances between pairs of different feature vector co-ordinates within each of the sub-sets.

An effect is to take account of sub-sets defined by feature vectors that are not evenly distributed about some average value. Where the distribution is skewed in a particular direction, the distance along that direction is less heavily weighted when the distance measure based on the feature weighting matrix is applied to measure the distance of a feature vector to a feature vector or feature vectors that define a category, because the weighting matrix incorporates the knowledge that large variations along this direction are to be expected.

An embodiment of the method includes loading data representative of the weighting matrix into memory comprised in a consumer electronics device.

This embodiment represents an implementation to which the basic invention is well-suited, in that the weighting matrix can be based on a much larger training set than there are content items available for reproduction by the consumer electronics device. Thus, a relatively accurate classifier can be used in conjunction with a personal class definition by a user of the consumer electronics device based on a small collection of content items.

Another aspect described above concerns the use of a method according to the invention wherein the similarity measure is calculated using a weighted distance measure differentiating between coordinates of the feature vectors and based on weights that are invariant over the feature vectors characterising first content items associated with the first and further label to which the weighted distance measure is applied, in a system for recognising a source of a sound.

The system for recognising a source of sound may comprise a voice recognition system for recognising a speaker on the basis of a recording of his voice.

Because the categorisation made possible by the invention is achieved in a relatively simple manner on the basis of a small sample of content items, or even merely one, it is very suitable to a sound recognition system where only a small sound sample from a particular source might be available. Because the method provides the potential for "training" the similarity measurement on the basis of a large corpus of sounds assigned to their respective sources, weighting values can be used that are specifically appropriate to distinguishing between different sources of sound.

The invention claimed is:

1. Method of organising content items, including:
   in a multimedia reproduction device for rendering a signal in a content item,
   obtaining information associating each of a first and at least one further label with respective sets of a number of first content items,
   wherein at least one first content item is associated with the first label in response to user input;
   obtaining a second content item;
   for each of the first and further labels, determining any uneven distribution of feature vectors characterising first content items associated with a label over a feature space by calculating a similarity measure between a feature vector characterising the second content item and each of the feature vectors characterising first content items associated with the label; and
   associating the first label with the second content item upon determining that the second content item is similar to the first content items associated with the first label, according to calculated values of the similarity measure.

2. Method according to claim 1, wherein a user is allowed to define the first label by means of the user input.

3. Method according to claim 1, wherein the first label is associated with the second content item by storing information linking the first label to the second content item.

4. Method according to claim 1, further including allowing a user to associate at least one first content item with the first label by means of the user input.

5. Method according to claim 1, wherein the first label is associated with the second content item upon determining that the second content item is more similar to the first content items associated with the first label than to the first content items associated with the further labels.

6. Method according to claim 1, wherein at least one co-ordinate of each feature vector is obtainable by performing a pre-defined signal analysis on a signal comprised in the content item that is characterised by that feature vector, to determine a parameter value representative of a characteristic of the signal that is perceptible when rendered on a reproduction device.

7. Method according to claim 1, further including associating with the second content item data representative of at least one value based on the value of the similarity measure between the feature vector characterising the second content item and the feature vectors characterising content items associated with the first label.

8. Method according to claim 1, wherein the first label is associated with the second content item only upon determining that at least one value based on the value of the similarity measure between the feature vector characterising the second content item and the feature vectors characterising content items associated with the first label lies within a pre-determined range.

9. Method according to claim 1, wherein the similarity measure is calculated by:
   calculating a weighted distance between feature vectors according to the weighted distance measure and
   applying a function based on a probability distribution to the calculated weighted distance.

10. Method according to claim 9, wherein the function based on a probability distribution is parameterised across the sets of first content items associated with the first and further labels.

11. Method according to claim 9, wherein a similarity measure between a feature vector characterising the second content item and any feature vector characterising a content item associated with a label is normalised by a factor dependent on the number $M_c$ of first content items comprised in the set associated with the label.

12. Method according to claim 11, wherein the similarity measure is normalised by a factor inversely proportional to the number $M_c$ of first content items comprised in the set associated with the label, exponentiated with an exponent having a value in the range of zero to one.

13. Method according to claim 9, wherein the function based on a probability distribution includes a variable parameter specifying a width of the probability distribution, wherein the variable parameter is assigned a value depending on the total number of associations between a first content item and the first or a further label.

14. Method according to claim 13, wherein, for a particular one of the first and further labels, the variable parameter is assigned a value that is a function of values of a number of the smallest distances according to the weighted distance measure between pairs of feature vectors in the set of first content items associated with that label.

15. Method according to claim 13, wherein the variable parameter is a function of an average distance according to the weighted distance measure between arbitrary pairs of all feature vectors characterising the first content items associated with the first or a further label.

16. Method according to claim 1, including calculating the similarity measure using a weighted distance measure differentiating between coordinates of the feature vectors and based on a feature weighting matrix obtainable by obtaining a training set of feature vectors, each characterising one of a plurality of content items,
   each of the feature vectors being comprised in at least one of a plurality of sub-sets, and
   populating the weighting matrix with values optimised such that pairs of feature vectors comprised in a common sub-set will have a large weighted distance relative to pairs of feature vectors comprised in disjoint sub-sets.

17. A multimedia reproduction device for organising content items, the device comprising:
   a processor to associate at least one first content item with a first label in response to user input, obtain information associating each of at least one further label with respective sets of a number of first content items; obtain a second content item; for each of the first and further labels, determine any uneven distribution of feature vectors characterising first content items associated with a label over a feature space by calculating a similarity measure between a feature vector characterising the second content item and each of the feature vectors characterising first content items associated with the label; and to associate the first label with the second content item upon determining that the second content item is similar to the first content items associated with the first label, according to calculated values of the similarity measure.

18. Device according to claim 17, configured to execute a method of organising content items, including:
- obtaining information (19-21) associating each of a first and at least one further label with respective sets of a number of first content items,
- wherein at least one first content item is associated with the first label in response to user input;
- obtaining a second content item;
- for each of the first and further labels, calculating a similarity measure between a feature vector characterising the second content item and each of the feature vectors characterising first content items associated with the label; and
- associating the first label with the second content item upon determining that the second content item is similar to the first content items associated with the first label, according to calculated values of the similarity measure.

19. Computer readable medium, comprising instructions accessed by a processor for causing said processor to execute:
- code for obtaining information associating each of a first and at least one further label with respective sets of a number of first content items, wherein at least one first content item is associated with the first label in response to user input;
- code for obtaining a second content item; for each of the first and further labels, determining any uneven distribution of feature vectors characterising first content items associated with a label over a feature space by calculating a similarity measure between a feature vector characterising the second content item and each of the feature vectors characterising first content items associated with the label; and
- code for associating the first label with the second content item upon determining that the second content item is similar to the first content items associated with the first label, according to calculated values of the similarity measure.

* * * * *